United States Patent [19]

Kunimune et al.

[11] Patent Number: 4,904,758
[45] Date of Patent: Feb. 27, 1990

[54] LOW-MELTING POLYIMIDE COPOLYMER AND METHOD FOR PREPARING THE SAME

[75] Inventors: Kouichi Kunimune, Chiba; Hirotoshi Maeda, Yokohama, both of Japan

[73] Assignee: Chisso Corporation, Osaka, Japan

[21] Appl. No.: 293,326

[22] Filed: Jan. 5, 1989

[30] Foreign Application Priority Data

Jan. 6, 1988 [JP] Japan .................................. 63-1012

[51] Int. Cl.$^4$ ............................................. C08G 69/26
[52] U.S. Cl. ..................................... 528/353; 528/128; 528/172; 528/183; 528/188; 528/189
[58] Field of Search ................ 528/353, 128, 172, 183, 528/188, 189

[56] References Cited

U.S. PATENT DOCUMENTS

| | | | |
|---|---|---|---|
| 3,998,786 | 12/1976 | D'Alelio | 528/353 |
| 4,316,844 | 2/1982 | Waitkus | 528/353 |
| 4,568,715 | 2/1986 | Itatani et al. | 528/172 |

FOREIGN PATENT DOCUMENTS

| | | |
|---|---|---|
| 0122060 | 3/1984 | European Pat. Off. |
| 8600335 | 3/1987 | Japan |
| 63-199237 | 8/1988 | Japan |
| 2174399 | 11/1986 | United Kingdom |

OTHER PUBLICATIONS

Patent Abstracts of Japan, vol. 12, No. 482.

*Primary Examiner*—John Kight
*Assistant Examiner*—M. L. Moore
*Attorney, Agent, or Firm*—Fred Philpitt

[57] ABSTRACT

The present invention is connected with a low-melting polyimide copolymer containing 30 to 90 mole % of an imide repeating unit represented by the following formula (I) and 10 to 70 mole % of an imide repeating unit represented by the following formula (II), and having a logarithmic viscosity number of 0.1 to 5 dl/g:

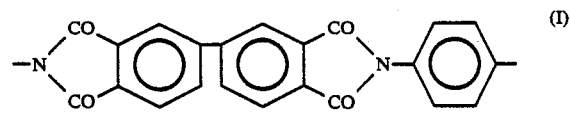

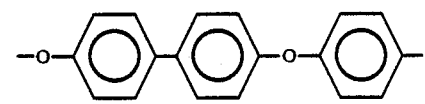

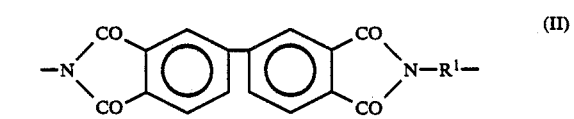

wherein $R^1$ is at least one of

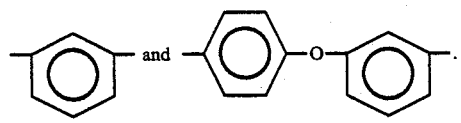

Furthermore, the present invention is connected with a method of preparing the low-melting polyimide copolymer.

Since having a melting point of about 300° to about 400° C., the polyimide copolymer of the present invention has heat resistance and enables melt-moldings such as extrusion and injection molding.

7 Claims, 1 Drawing Sheet

LOW-MELTING POLYIMIDE COPOLYMER AND METHOD FOR PREPARING THE SAME

BACKGROUND OF THE INVENTION

(1) Field of the Invention

The present invention relates to a melt-moldable low-melting polyimide copolymer and a method for preparing the same.

(2) Description of the Prior Art

In general, polyimides are widely used as protective materials and insulating materials in electronic equipment fields, and adhesive materials, films and structural materials because they are organic polymer compounds having high heat resistance, good electrical characteristics and mechanical characteristics. However, conventional polyimides have high melting points or glass transition temperatures, which are in excess of or in the vicinity of thermal decomposition temperatures of most polyimides, and thus it is usually difficult to melt-mold the polyimides. For this reason, the molding of the polyimide has been performed almost by molding techniques for thermosetting resins, for example, by coating and calcining a precursor or a soluble polyimide solution of the polyimide, or by compression-molding a powdery polyimide at high temperature and pressure. If a polyimide is obtained to which molding techniques for thermoplastic resins such as extrusion and injection molding can be applied, the improvement of productivity as well as the molding of articles having various shapes will become possible, which will heighten economical effect. Therefore, suggestions regarding meltable polyimides have often been made. For example, in Japanese Patent Laid-open Publication No. 203132/1986, there is suggested a crystalline silicone imide copolymer. In addition, Japanese Patent Laid-open Publication No. 250031/1986 reveals a specific pyromellitic imide copolymer as the meltable polyimide copolymer.

However, with regard to the copolymers referred to in the above-mentioned Japanese Patent Laid-open Publication No. 203132/1986, their melting points are in the range of 140 to 210° C. judging from values in its examples. In this laid-open invention, it can be considered that heat resistance which is one feature of the polyimide is sacrificed in order to improve moldability. In Japanese Patent Laid-open Publication No. 250031/1986, it is described that the suggested copolymer can be molded into a film by melt-press at 400° C., and its effect is also shown. However, any melting point of the copolymer is not mentioned therein, and it is not apparent either whether or not the copolymer is, in fact, the crystalline polymer.

In general, even the polyimides each comprising an aromatic skeleton as the main component are partially decomposed at a temperature higher than 450° C., so that articles molded therefrom will be noticeably colored. In view of the easiness of molding, a practical temperature in the extrusion and the injection molding is usually about 50° C. above the melting point of the polyimide. Thus, it is preferable that the polyimide has a melting point of 400° C. or less, and additionally in view of use applications where heat resistance is required, the polyimide preferably has a melting point of 300° C. or more. As understood from the foregoing, the polyimides having melting points of 300° to 400° C. are very valuable, and thus the development of such polyimides has been demanded.

SUMMARY OF THE INVENTION

Objects of the present invention are to provide a polyimide having a melting point of about 300° to 400° C. and to provide a method for preparing such a polyimide.

The first aspect of the present invention is directed to a low-melting polyimide copolymer containing 30 to 90 mole % of the following imide repeating unit (I), containing 10 to 70 mole % of the following imide repeating unit (II), containing or not containing the following imide repeating unit (III), and having a logarithmic viscosity number of 0.1 to 5 dl/g when measured in concentrated sulfuric acid at a temperature of 30°±0.01° C. at a concentration of 0.5 g/dl:

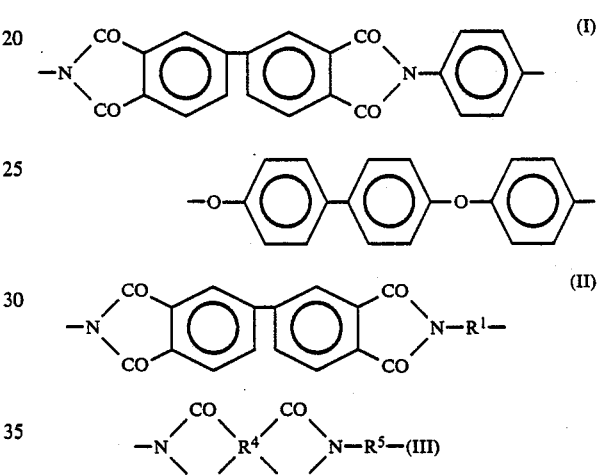

wherein $R^1$ is at least one of

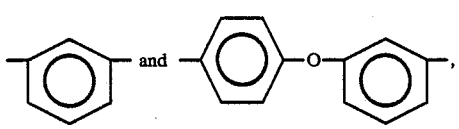

$R^4$ is at least one of

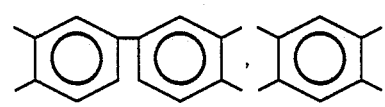

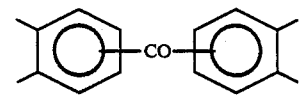

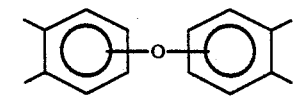

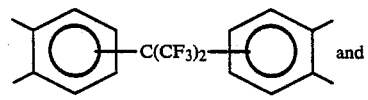

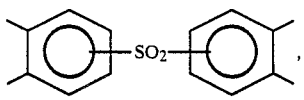

$R^5$ is a carbon cyclic aromatic group having 6 to 50 carbon atoms, but when $R^4$ is

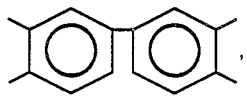

$R^5$ is neither

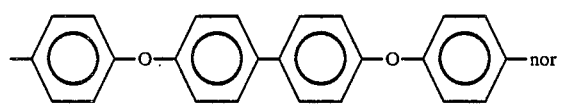 nor

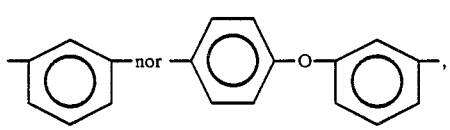, and when $R^5$ is

,

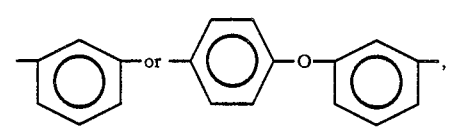, $R^4$ is not

The second aspect of the present invention is directed to a method for preparing a low-melting polyimide copolymer containing 30 to 90 mole % of the following imide repeating unit (I), containing 10 to 70 mole % of the following imide repeating unit (II), containing or not containing the following imide repeating unit (III), and having a logarithmic viscosity number of 0.1 to 5 dl/g when measured in concentrated sulfuric acid at a temperature of 30°±0.01° C. at a concentration of 0.5 g/dl, said method being characterized by comprising the steps of feeding raw materials at one time or dividedly to a reactor; reacting a diacid anhydride composed of $A^1$ mole of a compound represented by the following formula (IV) and $A^2$ mole of a compound represented by the following formula (V) with a diamine composed of $B^1$ mole of a compound represented by the following formula (VI), $B^2$ mole of a compound represented by the following formula (VII) and $B^3$ mole of a compound represented by the following formula (VIII) in compliance with relations of formulae (IX), (X), (XI) and (XII) regarding $A^1$, $A^2$, $B^1$, $B^2$ and $B^3$ in the presence of a solvent at a temperature of 0° to 200° C. under conditions where the diacid anhydride represented by the formula (IV) which accounts for at least 30 mole % of the whole diacid anhydride is reacted with the diamine represented by the formula (VI) which accounts for at least 30 mole % of the whole diamine and under conditions where the diacid anhydride represented by the formula (IV) which accounts for at least 10 mole % of the whole diacid anhydride is reacted with the diamine represented by the formula (VII) which accounts for at least 10 mole % of the whole diamine, in order to form a polyimide precursor; and heating the precursor up to a level of 100° to 400° C. or adding a known imide formation accelerator thereto and converting the precursor into the imide at a relatively low temperature of 10° to 100° C.:

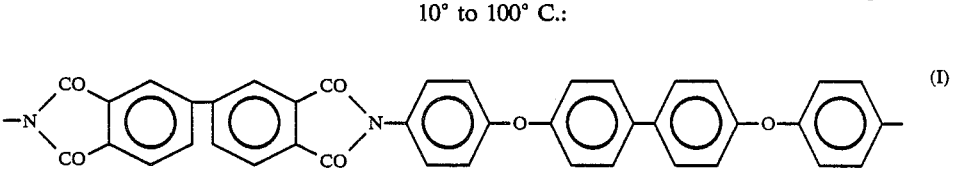 (I)

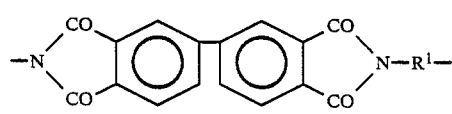 (II)

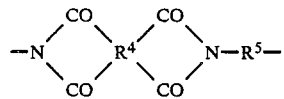 (III)

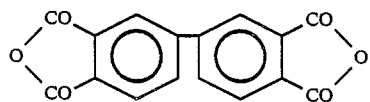 (IV)

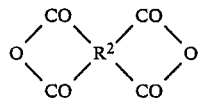 (V)

-continued

(VI)

NH₂—R¹—HN₂ (VII)
NH₂—R³—NH₂ (VIII)
$40 \leq 100A^1/(A^1 + A^2) \leq 100$ (IX)
$30 \leq 100B^1/(B^1 + B^2 + B^3) \leq 90$ (X)
$10 \leq 100B^2/(B^1 + B^2 + B^3) \leq 70$ (XI)
$0 \leq 100B^3/(B^1 + B^2 + B^3) \leq 60$ (XII)

wherein R¹ is at least one of

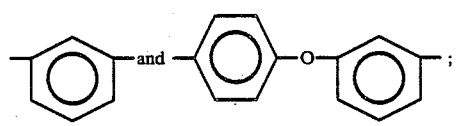

R² is at least one of

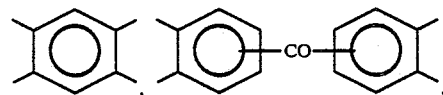

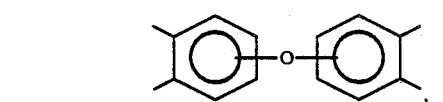

R³ is a carbon cyclic aromatic group having 6 to 50 carbon atoms except

R⁴ is at least one of

-continued

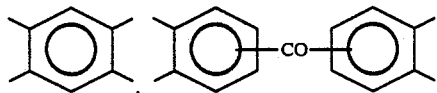

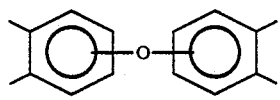

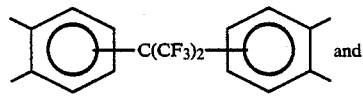

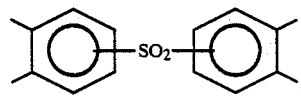

and R⁵ is a carbon cyclic aromatic group having 6 to 50 carbon atoms, but when R⁴ is

R⁵ is neither

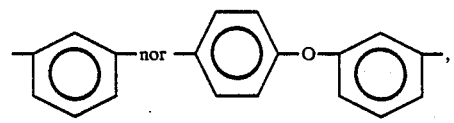

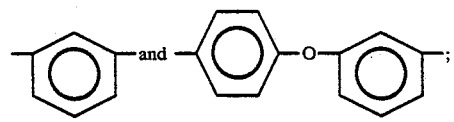

and when R⁵ is

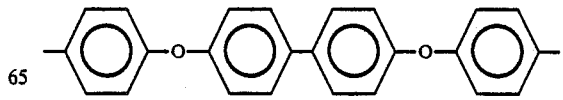

-continued

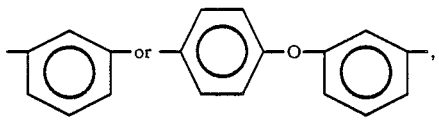

R⁴ is not

DETAILED DESCRIPTION OF THE INVENTION

Figure 1:
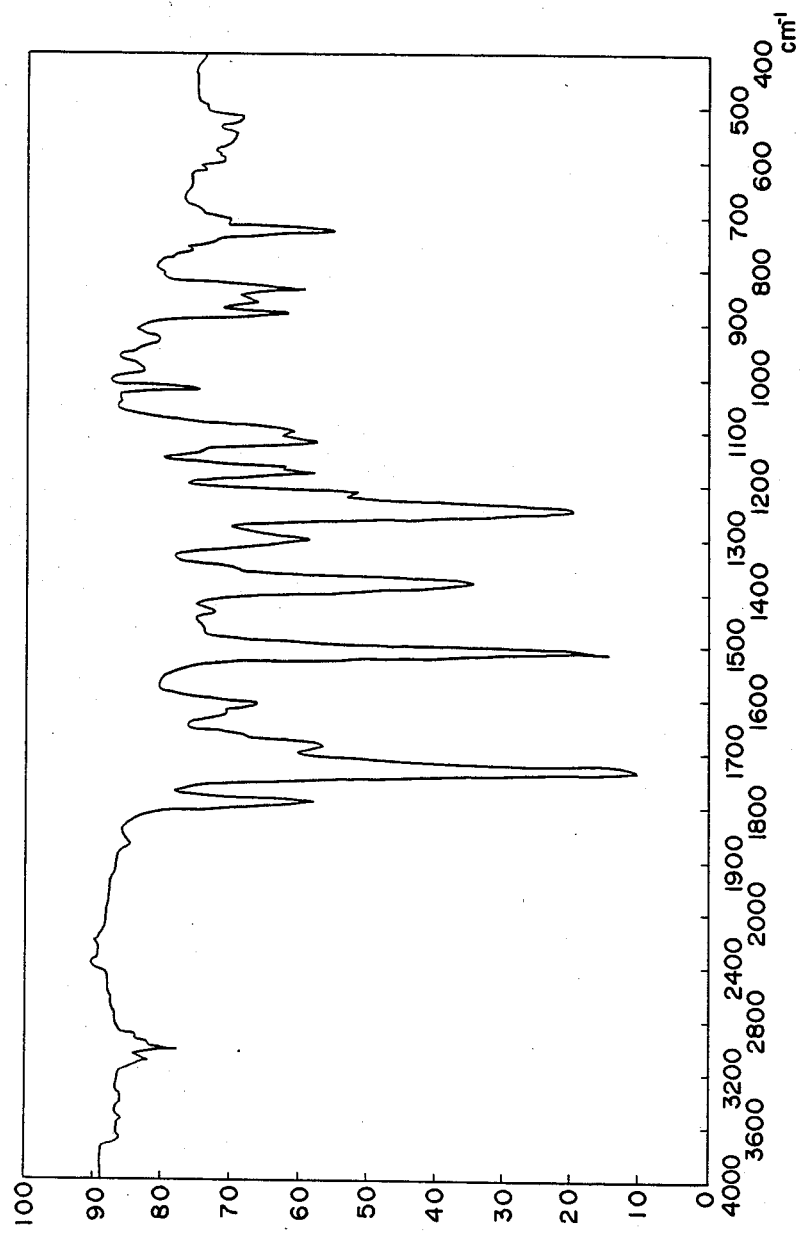

A low-melting polyimide copolymer of the present invention can be prepared by the above-mentioned method. The reaction in the method is performed under conditions where the diacid anhydride represented by the formula (IV) which accounts for at least 30 mole % of the whole diacid anhydride is reacted with the diamine represented by the formula (VI) which accounts for at least 30 mole % of the whole diamine and under conditions where the diacid anhydride represented by the formula (IV) which accounts for at least 10 mole % of the whole diacid anhydride is reacted with the diamine represented by the formula (VII) which accounts for at least 10 mole % of the whole diamine in the presence of a solvent at a temperature of 0° to 200° C. Therefore, if the above-mentioned conditions are satisfied, the compounds (IV), (V), (VI), (VII) and (VIII) which are raw materials can be mixed at one time and reacted, or alternatively after the reaction between the compounds (IV) and (VI), the compounds (IV) and (VII) may be reacted. In a certain case, the compounds (IV) and (VI) may be first reacted with each other, and afterward the compounds (IV) and (VII) may be then reacted, and the reaction between the compounds (IV) and (VI) may be performed again. In addition, these operations may be repeated for different raw materials in order to obtain a multi-block copolymer.

Examples of tetracarboxylic acid dianhydrides represented by the general formula (V) include pyromellitic acid dianhydride, 3,3',4,4'-benzophenonetetracarboxylic acid dianhydride, 2,3,3',4'-benzophenonetetracarboxylic acid dianhydride, bis(3,4-dicarboxyphenyl) ether dianhydride and bis(3,4-dicarboxyphenyl)sulfone dianhydride.

Examples of the diamines represented by the general formula (VII) include methaphenylenediamine and 3,4'-diaminodiphenyl ether.

Examples of the diamines represented by the general formula (VIII) include 4,4'-diaminodiphenyl ether, 4,4'-diaminodiphenylmethane, 3,3'-diaminodiphenyl sulfone, 4,4'-diaminodiphenyl sulfone, 4,4'-diaminodiphenyl sulfide, 4,4'-di(meta-aminophenoxy)diphenyl sulfone, 4,4'-di(paraaminophenoxy)diphenyl sulfone, paraphenylenediamine, benzidine, 2,2'-diaminobenzophenone, 4,4'-diaminobenzophenone, 2,2-bis[4-(4-aminophenoxy)phenyl]propane, 1,4-bis(4-aminophenoxy)benzene, 1,3-bis(4-aminophenoxy)benzene, 1,3-bis(3-aminophenoxy)benzene, 1,5-diaminonaphthalene, 1,8-diaminonaphthalene and 2,2-bis[4-(4-aminophenoxy)phenyl]hexaphloropropane.

In the present invention, as preferable solvents in which the above-mentioned raw material compounds are reacted, there can be mentioned N-methyl-2-pyrrolidone, dimethylacetamide, dimethylformamide, dimethyl sulfoxide, tetramethylurea, pyridine, dimethyl sulfone, hexamethylphosphone, methylformamide and N-acetyl-2-pyrrolidone, and they may be used alone or in a combination of two or more thereof.

Next, reference to the reaction in the present invention will be made. $A^1$ mole and $A^2$ mole of the tetracarboxylic acid dianhydrides respectively represented by the formulae (IV) and (V) are reacted with $B^1$ mole, $B^2$ mole and $B^3$ mole of the diamines respectively represented by the formulae (VI), (VII) and (VIII). At this time, $A^1$, $A^2$, $B^1$, $B^2$ and $B^3$ are set so as to satisfy the relations of the formulae (IX), (X), (XI) and (XII).

In the present invention, even if any polymerization manner is employed, it is preferred that the amount of the whole diacid anhydrides is substantially equimolar to that of the whole diamines. This facilitates the formation of a polymer having high molecular weight.

The reaction solvent is preferably used in an amount of 50% by weight or more based on the total amount of the added raw materials and the solvent. When the amount of the solvent is less than this level, stirring is difficult at times unpreferably.

After the above-mentioned five kinds of raw materials (in the case of the minimum, three kinds of raw materials) have been fed to a reactor at one time or dividedly, the reaction is performed at a temperature of 0° to 200° C. for several hours or several tens of hours. In this case, it is necessary that the reaction is carried out under conditions that the acid anhydride represented by the formula (IV) which accounts for at least 30 mole % of the whole diacid anhydride is reacted with the diamine represented by the formula (VI) which accounts for at least 30 mole % of the whole diamine and under conditions that the acid anhydride represented by the formula (IV) which accounts for at least 10 mole % of the whole diacid anhydride is reacted with the diamine represented by the formula (VII) which accounts for at least 10 mole % of the whole diamine, as described above. As a result of the reaction, a polyimide precursor solution is obtained. This solution is then heated up to a temperature of 100° to 400° C., or alternatively when an acid anhydride such as acetic anhydride and/or a known imide formation accelerator such as pyridine or isoquinoline is added to the solution, and the precursor is converted into an imide at a relatively low temperature of 10° to 100° C. In this way, the low-melting polyimide copolymer is obtained which contains 30 to 90 mole % of the aforesaid imide repeating unit (I), contains 10 to 70 mole % of the aforesaid imide repeating unit (II), contains or does not contain the aforesaid imide repeating unit (III), and has a logarithmic viscosity number of 0.1 to 5 dl/g when measured in concentrated sulfuric acid at a temperature of 30°±0.01° C. at a concentration of 0.5 g/dl. In the copolymer of the present invention, the higher the proportion of the repeating unit (I) becomes, the higher the melting point of the copolymer becomes; the higher the proportion of the repeating unit (II) becomes, the lower the melting point of the copolymer becomes. It is unpreferable that the repeating unit (III) is in excess of 60 mole %, because a clear melting point is not shown on occasion.

The average molecular weight of the polyimide of the present invention is such that the logarithmic viscosity number measured under the above-mentioned specific conditions is in the range of 0.1 to 5 dl/g. This logarithmic viscosity number ($\eta_{inh}$) referred to in the present invention would be measured from the above-mentioned measurement conditions, but it can be defined in detail as follows:

$$\eta_{inh}=(\ln \eta/\eta_o)/C$$

wherein $\eta$ is a value measured by the use of a Ubbelohde's viscometer in concentrated sulfuric acid at a concentration of 0.5 g/dl at a temperature of 30°±0.01° C., and $\eta_o$ is a value of concentrated sulfuric acid measured by the use of the Ubbelohde's viscometer at the identical temperature.

When the logarithmic viscosity number is less than 0.1, the obtained copolymer has poor mechanical strength, and when it is in excess of 5, the synthesis of the copolymer was difficult.

The fundamental structure of the polyimide copolymer obtained by the method of the present invention is composed of the repeating units represented by the formulae (I) and (II), and if necessary, the repeating unit of the formula (III) is further contained therein. These repeating units may be present in a random state, a block state or any other copolymerization state.

Typical examples of the imide repeating unit represented by the formula (III) are as follows:

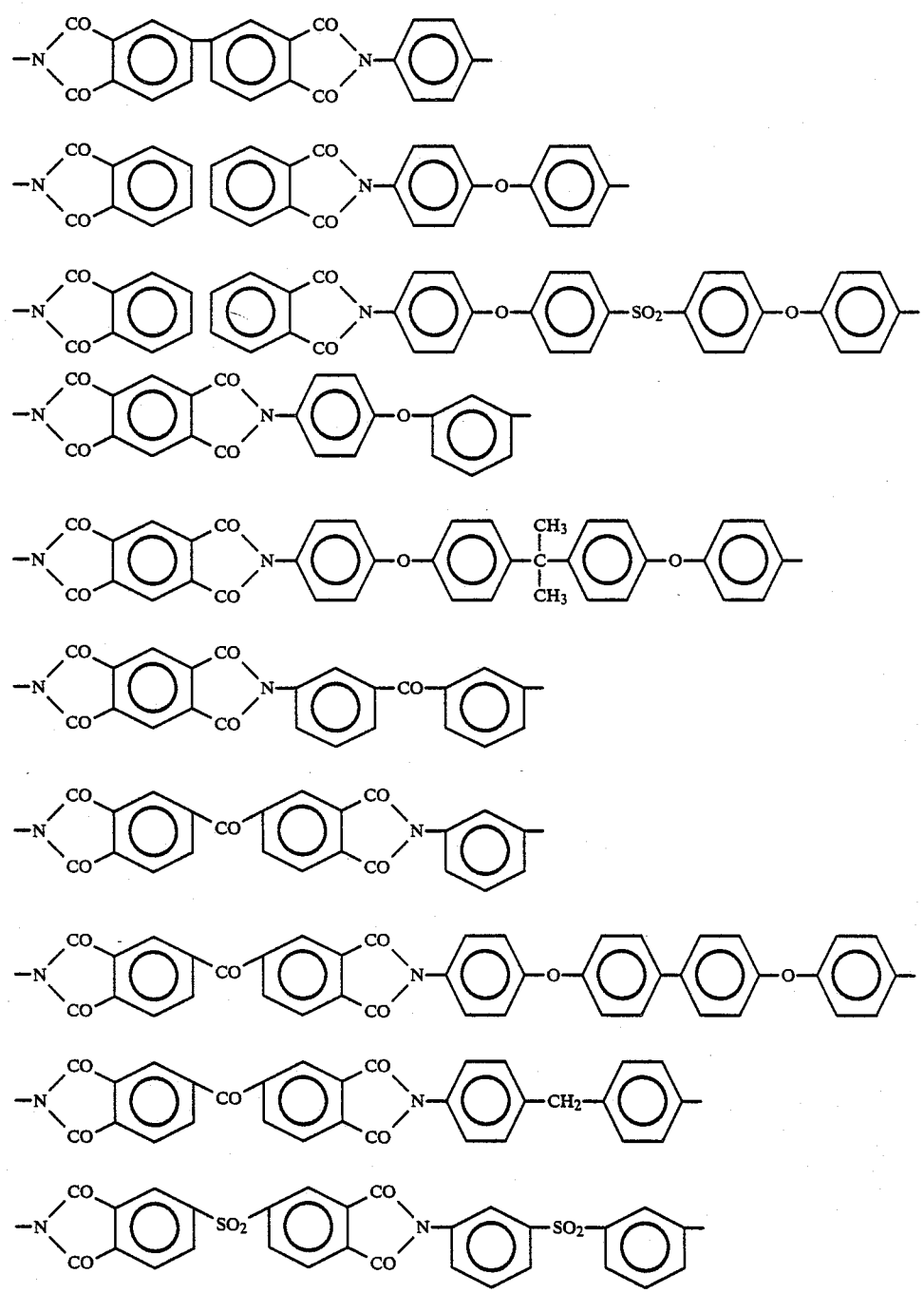

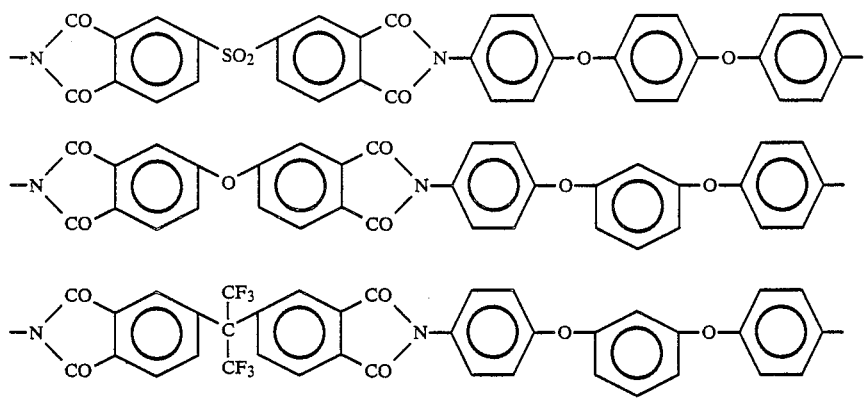

The polymer of the present invention suitably has a melting point of 300° to 400° C. When the melting point of the polymer is less than 300° C., heat resistance is poor, which lowers the value of products made therefrom. On the contrary, when it is more than 400° C., a part of the polymer is thermally decomposed, so that the molded articles are noticeably colored unpreferably.

Next, reference will be made to the usage of the polyimide copolymer of the present invention. Like the usual polyimide, needless to say, the polyimide copolymer of the present invention, while being in the state of the liquid precursor (polyamic acid), may be subjected to spin coating, printing, casting or the like on various substrates, and heating follows to give off the used solvent and to perform the reaction of the imide formation, thereby molding the copolymer. However, as the preferable usage, the melt-molding of the copolymer is accomplished by extruding or injection molding the powder, flakes or grains of the polyimide copolymer of the present invention which have been prepared by heating and drying the polyimide to remove volatile components such as the solvent and the like. To sum up, the polyimide copolymer of the present invention can be molded into various molded articles, fibers, films, sheets and the like by heating the polyimide copolymer at a temperature of its melting point or more.

Since having a melting point of about 300 to about 400° C., the polyimide copolymer of the present invention is excellent in heat resistance and permits the application of melt-moldings such as extrusion and injection molding. Therefore, the industrial advantage of the present invention is great.

EXAMPLES

Now, the present invention will be described in detail in reference to examples and comparative examples, but needless to say, the scope of the present case should not be limited by these examples.

EXAMPLE 1

One-liter flask equipped with a stirrer, a dropping funnel, a thermometer, a condenser and a nitrogen replacer was fixed in a thermostatic chamber. After the atmosphere in the flask had been replaced with a nitrogen gas, 500 g of dehydrated and purified N-methyl-2-pyrrolidone (hereinafter referred to simply as NMP), 38.94 g (0.106 mole) of 4,4'-bis(4-aminophenoxy)biphenyl (hereinafter referred to simply as BAPB) and 4.89 g (0.0452 mole) of methaphenylenediamine (hereinafter referred to simply as m-PDA) were added thereto, and stirring was continued to dissolve them. Afterward, 44.42 g (0.151 mole) of 3,3',4,4'-biphenyltetracarboxylic acid dianhydride (hereinafter referred to simply as BPDA) was added to the solution in the flask slowly over 30 minutes through the dropping funnel, and reaction was continued. During this period of time, a reaction temperature was in the range of 10° to 20° C. The reaction was further continued at this temperature for 15 hours in order to obtain a viscous varnish. This varnish was then poured into a great deal of acetone, and deposited powder was collected by filtration, thereby obtaining polyamic acid powder. This powder was then heated at 300° C. for 2 hours in an oven, so that a polyimide copolymer of the present invention was prepared. According to the measurement of a melting point by means of a differential scanning calorimeter, the thus prepared copolymer showed an endothermic peak at 348° C. and melted. This denotation of the melting point testifies that the polymer was crystalline. Furthermore, the logarithmic viscosity number of the polymer in concentrated sulfuric acid was 0.82 dl/g.

The measurement of a melting point by the use of the differential scanning calorimeter DSC-1500M manufactured by Sinku-riko Co., Ltd. was carried out by raising the temperature of the polymer at a temperature rise rate of 5° C./minute, and reading the top of an endothermic peak. In the following examples, the same measurement manner was employed.

EXAMPLE 2

The same procedure as in Example 1 was repeated with the exception that 30.53 g (0.0829 mole) of BAPB, 8.96 g (0.0829 mole) of m-PDA and 48.76 g (0.166 mole) of BPDA were used, in order to obtain a viscous varnish. This varnish was then treated as in Example 1, whereby a polyimide copolymer of the present invention was prepared which had a melting point of 322° C. by the use of a differential scanning calorimeter and a logarithmic viscosity number of 0.58 dl/g in concentrated sulfuric acid.

EXAMPLE 3

By using the same devices and procedure as in Example 1, 43.34 g (0.118 mole) of BAPB and 2.24 g (0.0207 mole) of m-PDA were dissolved in 500 g of NMP, and while the solution was maintained at a temperature of 20° to 30° C., 20.36 g (0.0692 mole) of BPDA was added to the solution. Stirring was continued at this temperature for 6 hours, so that the solution was uniformed.

Afterward, 22.30 g (0.0692 mole) of 3,3',4,4'-benzophenonetetracarboxylic acid dianhydride was added thereto, and reaction was further perfomed at this temperature for 3 hours in order to obtain a viscous varnish. This varnish was then added dropwise to a great deal of an isoquinoline/acetic anhydride mixed solution (volume ratio =1/10) to obtain white powder, and the latter was then collected by filtration. The powder was then washed in acetone and then dried at 80° C. for 10 hours in a vacuum dryer in order to prepare a polyimide copolymer of the present invention. With regard to the thus prepared polyimide copolymer, its melting point was 386° C. when measured by a differential scanning calorimeter, and its logarithmic viscosity number in concentrated sulfuric acid was 1.3 dl/g.

EXAMPLE 4

By using the same devices and procedure as in Example 1, 18.59 g (0.0505 mole) of BAPB was poured into and dissolved in 500 g of NMP, and while the solution was maintained at a temperature of 20° to 30° C., 14.85 g (0.0505 mole) of BPDA was added to the solution. Reaction was performed at this temperature for 4 hours, and afterward, 8.66 g (0.0433 mole) of 3,4'-diaminodiphenyl ether (hereinafter referred to simply as 3,4'-DDE) and 12.74 g (0.0433 mole) of BPDA were added thereto. The reaction was further perfomed at this temperature for 2 hours. Additionally, 18.59 g (0.0505 mole) of BAPB and 14.85 g (0.0505 mole) of BPDA were then added thereto, and the reaction was performed for 8 hours in order to obtain a viscous varnish. This varnish was then treated as in Example 1 to obtain polyamic acid powder, and the latter was then heated at 240° C. for 2 hours in an oven in order to prepare a polyimide copolymer of the present invention. With regard to the thus prepared polyimide copolymer, its melting point was 382° C. when measured by a differential scanning calorimeter, and its logarithmic viscosity number in concentrated sulfuric acid was 1.8 dl/g.

EXAMPLE 5

By using the same devices and procedure as in Example 1, 21.38 g (0.0580 mole) of BAPB, 11.62 g (0.0580 mole) of 3,4'-DDE and 12.55 g (0.0290 mole) of bis[4-(4-aminiophenoxy)phenyl]sulfone was poured into and dissolved in 500 g of NMP, and while the solution was maintained at a temperature of 15° to 20° C., 42.69 g (0.145 mole) of BPDA was added to the solution. Reaction was performed for 20 hours in order to obtain a viscous varnish. This varnish was then treated as in Example 1 to obtain polyamic acid powder, and the latter was then heated at 240° C. for 2 hours in an oven in order to prepare a polyimide copolymer of the present invention. With regard to the thus prepared polyimide copolymer, its melting point was 368° C. when measured by a differential scanning calorimeter, and its logarithmic viscosity number in concentrated sulfuric acid was 1.9 dl/g.

EXAMPLE 6

By using the same devices and procedure as in Example 1, 25.67 g (0.0697 mole) of BAPB, 5.58 g (0.0279 mole) of 3.4'-DDE and 32.81 g (0.112 mole) of BPDA were poured into and dissolved in 500 g of NMP, and reaction was performed at a temperature of 10° to 20° C. for 10 hours. Afterward, 18.09 g (0.0418 mole) of 2,2-bis[4-(4-aminophenoxy)phenyl]-propane was added to the solution, and the reaction was further performed for 2 hours. Additionally, 6.08 g (0.0279 mole) of pyromellitic acid dianhydride was added thereto. The reaction was further perfomed for 5 hours in order to obtain a viscous varnish. This varnish was then treated as in Example 1 to obtain polyamic acid powder, and the latter was then heated at 240° C. for 2 hours in an oven in order to prepare a polyimide copolymer of the present invention. With regard to the thus prepared polyimide copolymer, its melting point was 390° C. when measured by a differential scanning calorimeter, and its logarithmic viscosity number in concentrated sulfuric acid was 2.2 dl/g.

EXAMPLE 7

By using the same devices and method as in Example 1, 35.54 g (0.0965 mole) of BAPB, 5.52 g (0.0276 mole) of 3.4'-DDE and 1.49 g (0.0138 mole) of m-PDA were poured into and dissolved in 500 g of dimethylacetamide. Afterward, 16.22 g (0.0551 mole) of BPDA was added to the solution, and reaction was then performed at 30 to 40° C. for 10 hours. Additionally, 29.61 g (0.0827 mole) of bis(3,4-dicarboxyphenyl) sulfone dianhydride was then added thereto, and the reaction was further perfomed for 6 hours in order to obtain a viscous varnish. This varnish was then treated as in Example 1 to obtain polyamic acid powder, and the latter was then heated at 240° C. for 2 hours in an oven in order to prepare a polyimide copolymer of the present invention. With regard to the thus prepared polyimide copolymer, its melting point was 363° C. when measured by a differential scanning calorimeter, and its logarithmic viscosity number in concentrated sulfuric acid was 1.0 dl/g.

COMPARATIVE EXAMPLE 1

By using the same devices and method as in Example 1, 49.06 g (0.133 mole) of BAPB was poured into and dissolved in 500 g of NMP. Afterward, 39.18 g (0.133 mole) of BPDA was added to the solution, and reaction was then performed at 20° to 30° C. for 15 hours in order to obtain a viscous varnish. This varnish was then treated as in Example 1 to obtain polyamic acid powder, and the latter was then heated at 240° C. for 2 hours in an oven in order to prepare a polyimide copolymer. With regard to the thus prepared polyimide copolymer, its melting point was 408° C. when measured by a differential scanning calorimeter, and its logarithmic viscosity number in concentrated sulfuric acid was 2.1 dl/g.

COMPARATIVE EXAMPLE 2

The same procedure as in Comparative Example 1 was repeated with the exception that 35.73 g (0.178 mole) of 3,4'-DDE was used as a diamine and 52.51 g (0.178 mole) of BPDA was used as a dianhydride, in order to carry out a similar reaction and treatment, thereby obtaining a polyimide. With regard to this polyimide, its logarithmic viscosity number in concentrated sulfuric acid was 1.4 dl/g, and its melting point was absent until 450° C. when measured by a differential scanning calorimeter.

COMPARATIVE EXAMPLE 3

The same procedure as in Comparative Example 1 was repeated with the exception that 23.71 g (0.219 mole) of m-PDA was used as a diamine and 64.53 g (0.219 mole) of BPDA was used as a dianhydride, in order to carry out a similar reaction and treatment, thereby obtaining a polyimide. With regard to this polyimide, its logarithmic viscosity number in concentrated sulfuric acid was 0.42 dl/g, and its melting point was absent until 450° C. when measured by a differential scanning calorimeter.

What is claimed is:

1. A low-melting polyimide copolymer containing 30 to 90 mole % of the following imide repeating unit (I), containing 10 to 70 mole % of the following imide repeating unit (II), containing or not containing the following imide repeating unit (III), and having a logarithmic viscosity number of 0.1 to 5 dl/g when measured in concentrated sulfuric acid at a temperature of 30°±0.01° C. at a concentration of 0.5 g/dl:

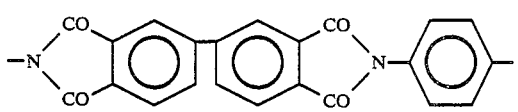
(I)

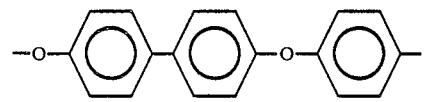

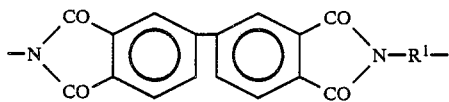
(II)

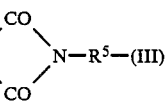
(III)

wherein $R^1$ is at least one of

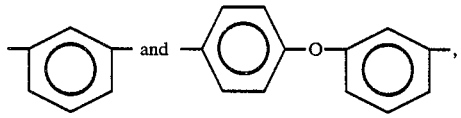

$R^4$ is at least one of

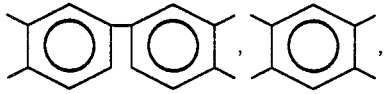

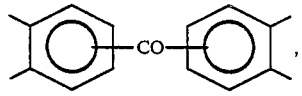

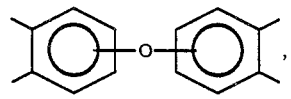

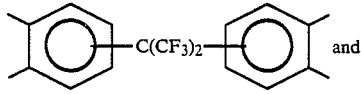

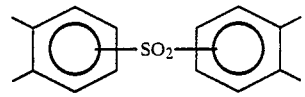

$R^5$ is a carbon cyclic aromatic group having 6 to 50 carbon atoms, but when $R^4$ is

$R^5$ is neither

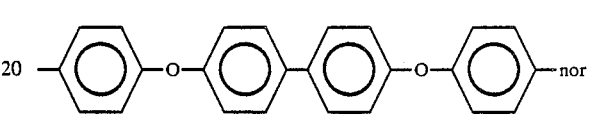

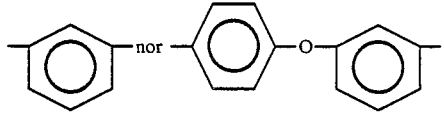

and when $R^5$ is

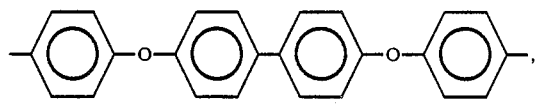

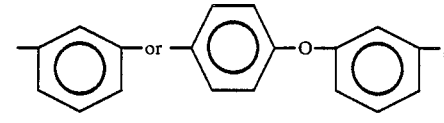

$R^4$ is not

2. A low-melting polyimide copolymer according to claim 1 wherein the copolymer has a melting point in the range of 300° to 400° C. when measured by a differential scanning calorimeter.

3. A method for preparing a low-melting polyimide copolymer containing 30 to 90 mole % of the following imide repeating unit (I), containing 10 to 70 mole % of the following imide repeating unit (II), containing or not containing the following imide repeating unit (III), and having a logarithmic viscosity number of 0.1 to 5 dl/g when measured in concentrated sulfuric acid at a temperature of 30°±0.01° C. at a concentration of 0.5 g/dl, the aforesaid method being characterized by comprising the steps of feeding raw materials at one time or dividedly to a reactor; reacting diacid anhydrides of $A^1$ mole of a compound represented by the following formula (IV) and $A^2$ mole of a compound represented by the following formula (V) with diamines of $B^1$ mole of a compound represented by the following formula (VI), $B^2$ mole of a compound represented by the following formula (VII) and $B^3$ mole of a compound represented by the following formula (VIII) in compliance with relations of formulae (IX), (X), (XI) and (XII) regarding $A^1$, $A^2$, $B^1$, $B^2$ and $B^3$ in the presence of a solvent at a temperature of 0° to 200° C. under conditions where the acid anhydride represented by th formula (IV) which accounts for at least 30 mole % of the whole diacid anhydride is reacted with the diamine represented by the formula (VI) which accounts for at least 30 mole % of the whole diamine and under conditions where the diacid anhydride represented by the formula (IV) which accounts for at least 10 mole % of the whole diacid anhydride is reacted with the diamine represented by the formula (VII) which accounts for at least 10 mole % of the whole diamine, in order to form a polyimide precursor; and heating the precursor at 100° to 400° C. or adding a known imide formation accelerator thereto and converting the precursor into the imide at a relatively low temperature of 10° to 100° C.:

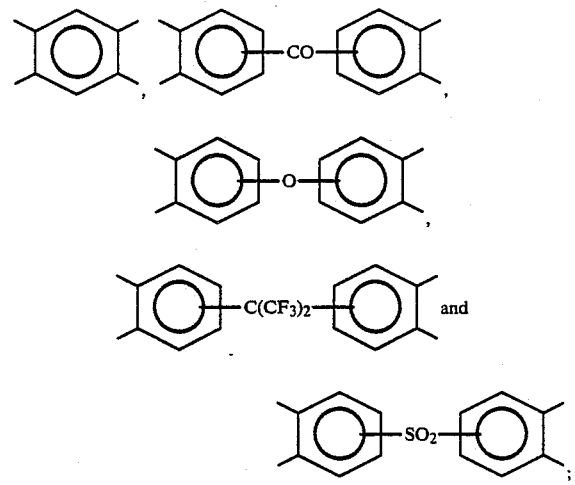

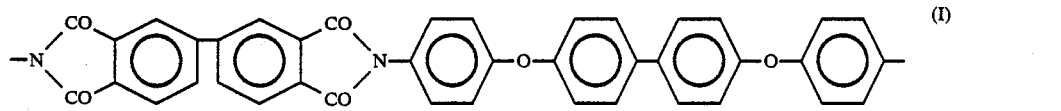 (I)

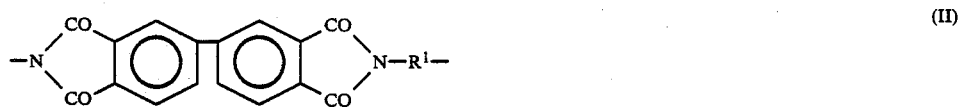 (II)

 (III)

 (IV)

 (V)

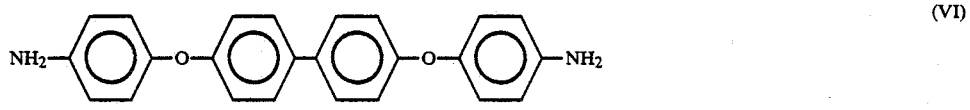 (VI)

$NH_2-R^1-HN_2$ (VII)
$NH_2-R^3-NH_2$ (VIII)
$40 \leq 100A^1/(A^1 + A^2) \leq 100$ (IX)
$30 \leq 100B^1/(B^1 + B^2 + B^3) \leq 90$ (X)
$10 \leq 100B^2/(B^1 + B^2 + B^3) \leq 70$ (XI)
$0 \leq 100B^3/(B^1 + B^2 + B^3) \leq 60$ (XII)

wherein $R^1$ is at least one of

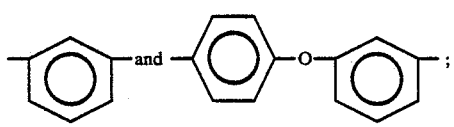

$R^2$ is at least one of $R^3$ is a carbon cyclic aromatic group having 6 to 50 carbon atoms except

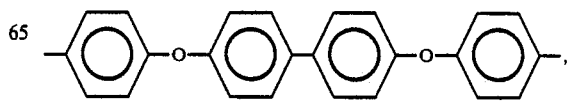

-continued

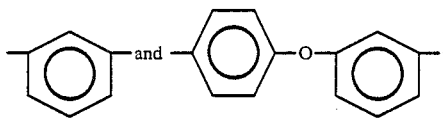

R⁴ is at least one of

,

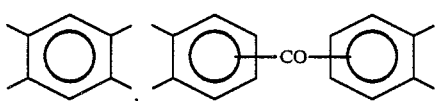,

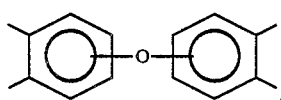,

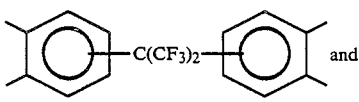 and

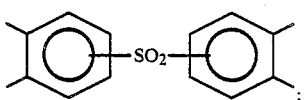;

and R⁵ is a carbon cyclic aromatic group having 6 to 50 carbon atoms, but when R⁴ is

,

R⁵ is neither

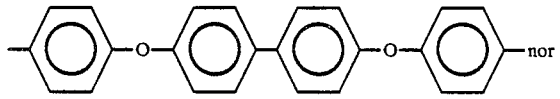

nor 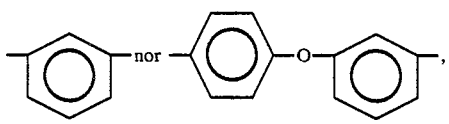, and when R⁵ is

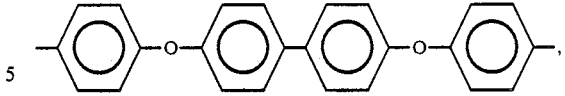,

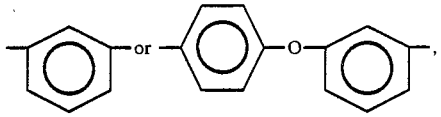

R⁴ is not

4. A method for preparing a low-melting polyimide copolymer according to claim 3 wherein the tetracarboxylic acid dianhydride represented by the general formula (V) is at least one selected from the group consisting of pyromellitic acid dianhydride, 3,3',4,4'-benzophenonetetracarboxylic acid dianhydride, 2,3,3',4'-benzophenonetetracarboxylic acid dianhydride, bis(3,4-dicarboxyphenyl) ether dianhydride and bis(3,4-dicarboxyphenyl) sulfone dianhydride.

5. A method for preparing a low-melting polyimide copolymer according to claim 3 wherein the diamine represented by the general formula (VII) is at least one selected from the group consisting of methaphenylenediamine and 3,4'-diaminodiphenyl ether.

6. A method for preparing a low-melting polyimide copolymer according to claim 3 wherein the diamine represented by the general formula (VIII) is at least one selected from the group consisting of 4,4'-diaminodiphenyl ether, 4,4'-diaminodiphenylmethane, 3,3'-diaminodiphenyl sulfone, 4,4'-diaminodiphenyl sulfone, 4,4'-diaminodiphenyl sulfide, 4,4'-di(meta-aminophenoxy)diphenyl sulfone, 4,4'-di(para-aminophenoxy)diphenyl sulfone, para-phenylenediamine, benzidine, 2,2'-diaminobenzophenone, 4,4'-diaminobenzophenone, 2,2-bis[4-(4-aminophenoxy)phenyl]propane, 1,4-bis(4-aminophenoxy)benzene, 1,3-bis(4-aminophenoxy)benzene, 1,3-bis(3-aminophenoxy)benzene, 1,5-diaminonaphthalene, 1,8-diaminonaphthalene and 2,2-bis[4-(4-aminophenoxy)phenyl]hexafluoropropane.

7. A method for preparing a low-melting polyimide copolymer according to claim 3 wherein a solvent, in which the above-mentioned raw material compounds are dissolved and reacted, is at least one selected from the group consisting of N-methyl-2-pyrrolidone, dimethylacetamide, dimethylformamide, dimethyl sulfoxide, tetramethylurea, pyridine, dimethyl sulfone, hexamethylphosphoneamide, methylformamide and N-acetyl-2-pyrrolidone.

* * * * *